(12) United States Patent
Takacs et al.

(10) Patent No.: US 11,388,801 B2
(45) Date of Patent: Jul. 12, 2022

(54) TUBULAR LED BALLAST BUCK-BOOST CONVERTER

(71) Applicant: ENERGY FOCUS, INC., Solon, OH (US)

(72) Inventors: Laszlo A. Takacs, San Mateo, CA (US); Attila Tomasovics, San Jose, CA (US); Matthew Downie, Solon, OH (US); John McGreevey, Solon, OH (US)

(73) Assignee: ENERGY FOCUS, INC., Solon, OH (US)

( * ) Notice: Subject to any disclaimer, the term of this patent is extended or adjusted under 35 U.S.C. 154(b) by 0 days.

(21) Appl. No.: 17/167,399

(22) Filed: Feb. 4, 2021

(65) Prior Publication Data
US 2021/0243865 A1     Aug. 5, 2021

Related U.S. Application Data

(60) Provisional application No. 62/970,550, filed on Feb. 5, 2020.

(51) Int. Cl.
*H05B 45/375* (2020.01)
*H05B 45/38* (2020.01)
*F21K 9/278* (2016.01)
*F21Y 115/10* (2016.01)
*F21Y 103/00* (2016.01)

(52) U.S. Cl.
CPC ........... *H05B 45/375* (2020.01); *H05B 45/38* (2020.01); *F21K 9/278* (2016.08); *F21Y 2103/00* (2013.01); *F21Y 2115/10* (2016.08)

(58) Field of Classification Search
None
See application file for complete search history.

(56) References Cited

U.S. PATENT DOCUMENTS

| | | | |
|---|---|---|---|
| 2012/0049819 A1* | 3/2012 | Mao | H02J 1/001 323/282 |
| 2012/0262144 A1* | 10/2012 | Lyons | H05B 45/3725 323/311 |
| 2014/0239810 A1 | 8/2014 | Martin-Lopez et al. | |
| 2015/0303807 A1* | 10/2015 | Garvey | H02M 3/07 323/271 |
| 2017/0025955 A1 | 1/2017 | Hang et al. | |
| 2017/0179829 A1* | 6/2017 | Ramabhadran | H02M 3/1582 |
| 2020/0053847 A1* | 2/2020 | Mao | H05B 45/345 |

OTHER PUBLICATIONS

International Search Report and Written Opinion, PCT/US2021/016548, dated May 3, 2021, 16 pages.

\* cited by examiner

*Primary Examiner* — Anh Q Tran
(74) *Attorney, Agent, or Firm* — Rankin, Hill & Clark LLP

(57) ABSTRACT

A buck-boost converter may include a first switch, an inductor, a first diode, a second switch, a second diode, and a capacitor. A cathode end of the first diode may be coupled to a first end of the inductor and a second end of the first switch. An anode end of the second diode may be coupled to a second end of the inductor and a first end of the second switch. A second end of the capacitor may be coupled to a second end of the second switch and an anode end of the first diode. A first end of the capacitor may be coupled to a cathode end of the second diode.

20 Claims, 2 Drawing Sheets

TUBULAR LED BALLAST BUCK-BOOST CONVERTER

CROSS-REFERENCE TO RELATED APPLICATIONS

This application claims the benefit of U.S. Provisional Patent Application, Ser. No. 62/970,550 entitled "SWITCHABLE TOPOLOGY AND INJECTING BUCK-BOOST CYCLES", filed on Feb. 5, 2020; the entirety of the above-noted application is incorporated by reference herein.

BACKGROUND

Generally, a buck convertor takes a voltage and brings the voltage down to a lower voltage, while a boost convertor takes a voltage and brings the voltage up to a higher voltage.

BRIEF DESCRIPTION

According to one aspect, a tubular light emitting diode (LED) ballast may include a buck-boost converter circuit. The tubular LED ballast may include a first switch including a first end and a second end, an inductor including a first end and a second end, a first diode including a cathode end and an anode end, a second switch including a first end and a second end, a second diode including a cathode end and an anode end, and a capacitor including a first end and a second end. The cathode end of the first diode may be coupled to the first end of the inductor and the second end of the first switch. The anode end of the second diode may be coupled to the second end of the inductor and the first end of the second switch. The second end of the capacitor may be coupled to the second end of the second switch and the anode end of the first diode. The first end of the capacitor may be coupled to the cathode end of the second diode.

The first switch and the second switch may be transistors. In a first, buck-boost converter mode, the first switch and the second switch may be driven by a same input signal. In the first, buck-boost converter mode, the first switch and the second switch may be driven by a waveform input signal. In the first, buck-boost converter mode, the first diode and the second diode may be freewheeling diodes. In a second, buck converter mode, the first switch may be driven by a waveform input signal and the second switch may be open. In the second, buck converter mode, the first diode may be a freewheeling diode. In a third, boost converter mode, the first switch may be closed and the second switch may be driven by a waveform input signal. In the third, boost converter mode, the second diode may be a freewheeling diode.

The first switch and the second switch may be driven based on a reading associated with the inductor. The first switch and the second switch may be driven based on a rectified AC voltage across the first diode. The first switch and the second switch may be driven based on sensing a DC voltage across the capacitor.

According to one aspect, a tubular light emitting diode (LED) ballast may include a buck-boost converter circuit. The tubular LED ballast may include a first switch, a first loop, and a second loop. The first switch may include a first end and a second end. The first loop may include an inductor including a first end and a second end, a first diode including a cathode end and an anode end, the cathode end of the first diode may be coupled to the first end of the inductor and the second end of the first switch, and a second switch including a first end and a second end. The second loop may include a second diode including a cathode end and an anode end, the anode end of the second diode may be coupled to the second end of the inductor and the first end of the second switch and a capacitor including a first end and a second end, the second end of the capacitor may be coupled to the second end of the second switch and the anode end of the first diode and the first end of the capacitor may be coupled to the cathode end of the second diode.

In a first, buck-boost converter mode, the first switch and the second switch may be driven by a same input signal. In a second, buck converter mode, the first switch may be driven by a waveform input signal and the second switch may be open. In a third, boost converter mode, the first switch may be closed and the second switch may be driven by a waveform input signal.

According to one aspect, a tubular light emitting diode (LED) ballast may include a buck-boost converter circuit. The tubular LED ballast may include a first switch including a first end and a second end, an inductor including a first end and a second end, a first diode including a cathode end and an anode end, a second switch including a first end and a second end, a second diode including a cathode end and an anode end, and a capacitor including a first end and a second end.

The cathode end of the first diode may be coupled to the first end of the inductor and the second end of the first switch. The anode end of the second diode may be coupled to the second end of the inductor and the first end of the second switch. The second end of the capacitor may be coupled to the second end of the second switch and the anode end of the first diode. The first end of the capacitor may be coupled to the cathode end of the second diode. In a first, buck-boost converter mode, the first switch and the second switch may be driven by a waveform input signal. In a second, buck converter mode, the first switch may be driven by the waveform input signal and the second switch may be open. In a third, boost converter mode, the first switch may be closed and the second switch may be driven by the waveform input signal.

The first switch and the second switch may be driven based on a reading associated with the inductor. The first switch and the second switch may be driven based on a rectified AC voltage across the first diode. The first switch and the second switch may be driven based on sensing a DC voltage across the capacitor.

DETAILED DESCRIPTION

Figure 1:
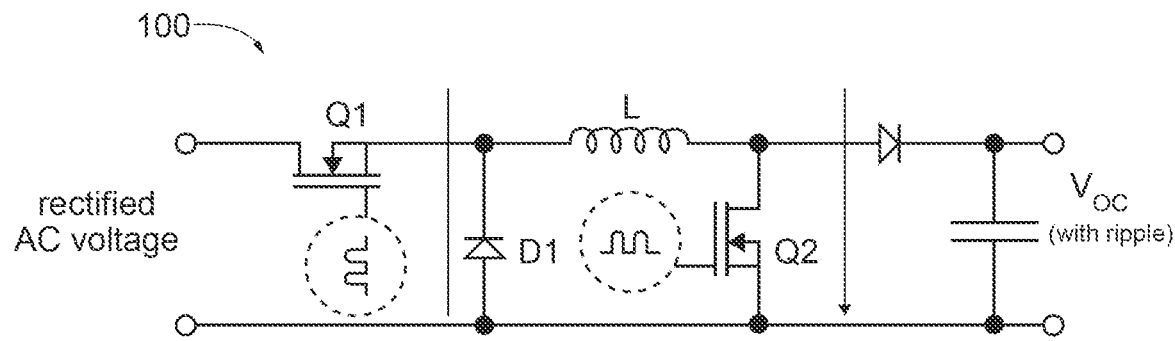
FIG. 1 is an exemplary circuit diagram of a tubular light emitting diode (LED) ballast including a buck-boost converter operating in a first mode, according to one aspect.

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

A "processor" as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Universal Synchronous-Asynchronous Receiver/Transmitter (USART), serial peripheral interface (SPI), or Inter-integrated Circuit (I2C), among others.

An "operable connection", or a connection by which entities are "operably connected", is one in which signals, physical communications, and/or logical communications may be sent and/or received. An operable connection may include a wireless interface, a physical interface, a data interface, and/or an electrical interface.

According to one aspect, the buck-boost converter and/or associated circuitry described herein may dynamically switch a mode, a converter mode, or a topology of the converter. For example, the circuitry may go from a buck-boost converter, to a buck converter, to a boost converter. For example, with a same lamp, depending upon the lamp is plugged into a 120 volt source or a 277 volt source, the circuitry may dynamically switch on the fly, depending on what the actual line voltage is.

FIG. 1 is an exemplary circuit diagram of a tubular light emitting diode (LED) ballast including a buck-boost converter operating in a first mode, according to one aspect. As seen in FIG. 1, the buck-boost converter circuit may include a first switch Q1 including a first end and a second end, an inductor L including a first end and a second end, a first diode D1 including a cathode end and an anode end, a second switch Q2 including a first end and a second end, a second diode D2 including a cathode end and an anode end, and a capacitor C including a first end and a second end. The cathode end of the first diode D1 may be coupled to the first end of the inductor L and the second end of the first switch Q1. The anode end of the second diode D2 may be coupled to the second end or the other end of the inductor L and the first end of the second switch Q2. The second end of the capacitor C may be coupled to the second end of the second switch Q2 and the anode end of the first diode D1. The first end of the capacitor C may be coupled to the cathode end of the second diode D2.

According to one aspect, the first switch Q1 and the second switch Q2 may be transistors. In a first, buck-boost converter mode, as illustrated by FIG. 1, the first switch Q1 and the second switch Q2 may be driven by a same input signal, such as a square waveform signal or any waveform signal, which may be provided from a microprocessor, for example. Thus, in the first, buck-boost converter mode, the first switch Q1 and the second switch Q2 may be driven by the same square waveform input signal. In this first, buck-boost converter mode, the first diode and the second diode may be freewheeling diodes. Here, the circuit may be a buck boost combination, so that the first switch Q1 and the second switch Q2 would both be on at the same time and the first switch Q1 and the second switch Q2 would both be off at the same time as well.

The first switch Q1 and the second switch Q2 may be driven based on a reading associated with the inductor L. The first switch Q1 and the second switch Q2 may be driven based on a rectified AC voltage across the first diode D1. The rectified AC voltage may be measured by a microcontroller via a voltage sense, analog to digital, an analog input to measure the rectified AC, which would measure that voltage and also measure the voltage on the DC side. According to one aspect, the microcontroller may operate the first switch Q1 and the second switch Q2 based on a magnetic field of the inductor being depleted or a PWM frequency. The power may be determined based on the rectified AC voltage and the $V_{DC}$ out, but the frequency changes may be determined based on the inductor L. A current sense control circuit may momentarily pause switching to mitigate overcurrent in the circuit.

The first switch Q1 and the second switch Q2 may also be driven based on sensing a DC voltage (e.g., $V_{DC}$) across the capacitor C. According to one aspect, the first switch Q1 and the second switch Q2 may be driven based on the AC wave form and where the voltage currently is at, at that moment in time. In the AC wave form, the voltage may max out at a voltage and then go to zero, and effectively be a sine wave. An LED strip may be powered by a DC voltage, such as at 225 volt DC, for example. In this regard, the AC voltage is going to obviously go above that and below this DC voltage. Based on where that AC voltage is, the circuit may switch to either a buck topology or a boost topology.

According to one aspect, as the line voltage comes up or rises, the circuit may be in a boost mode and creating more voltage so that the circuit could run the LEDs to 200 volts, for example. And as the circuit gets the line up to about 200 volts, the circuit may switch to a buck boost mode, which may run the lamp either above or below the convertor voltage. And then as the line increases to beyond the LED voltage (e.g., 225, 250, 300 volts), then the circuit may go into a buck mode. And then on the way down the circuit may achieve the reverse.

In buck-boost mode, Q1 and Q2 may share a gate control signal and turn on and off simultaneously. When both Q1 and Q2 are turned on, the input voltage may be applied to the inductor L and energy may be stored in the inductor L. Here, the output capacitor C may supply the load current. When Q1 and Q2 are turned off, diodes D1 and D2 may be forward-biased and thus, the inductor current may ramp down at a rate proportional to voltage out. Energy may thus be transferred from the inductor L to the output load and capacitor C.

Figure 2:
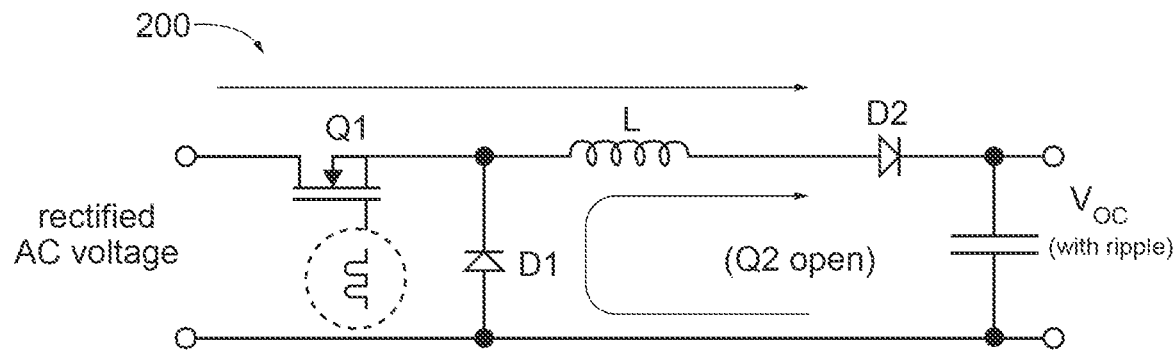
FIG. 2 is an exemplary circuit diagram of a tubular light emitting diode (LED) ballast including a buck-boost converter operating in a second mode, according to one aspect.

FIG. 2 is an exemplary circuit diagram of a tubular light emitting diode (LED) ballast including a buck-boost converter operating in a second mode, according to one aspect. In FIG. 2, a second, buck converter mode is illustrated. Here, the first switch Q1 may be driven by the square waveform input signal while the second switch Q2 may be held open (e.g., via the microprocessor controlling a gate of the second switch Q2). In the second, buck converter mode, the first diode may be the freewheeling diode. According to one aspect, the buck-boost converter circuit may be set to operate in the second mode when the input voltage is higher than the output voltage.

Figure 3:
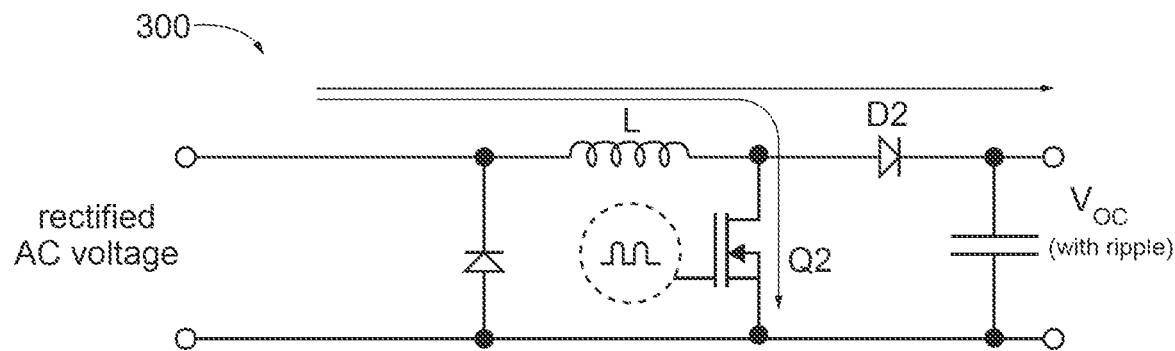
FIG. 3 is an exemplary circuit diagram of a tubular light emitting diode (LED) ballast including a buck-boost converter operating in a third mode, according to one aspect.

FIG. 3 is an exemplary circuit diagram of a tubular light emitting diode (LED) ballast including a buck-boost converter operating in a third mode, according to one aspect. In the third, boost converter mode, the first switch Q1 may be closed and the second switch Q2 may be driven by the square waveform input signal. In the third, boost converter mode, the second diode D2 may be the freewheeling diode. According to one aspect, the buck-boost converter circuit may be set to operate in the third mode when the input voltage is below the output voltage. According to another aspect, the circuit may have different percentages set for each inverter mode (i.e., the first buck-boost mode, the second buck mode, and the third boost mode). For example, one of the three modes may be engaged when the rectified AC voltage is plus or minus 10 to 15 volts of the $V_{DC}$ voltage.

The circuit of FIGS. 1-3 may use a 4-switch single-stage switching converter that has a switchable topology and is able to operate in at least three different modes: buck, boost, and buck-boost. The converter may be able to dynamically switch from one mode to another at will by controlling the first switch Q1 and the second switch Q2. This enables the microcontroller to select the ideal converter topology for the given instantaneous input voltage, and thereby achieve excellent efficiency at a wide range of input voltages. As the AC input voltage is continuously changing, the converter may change its operating mode several times in each line cycle to maintain maximum efficiency (e.g., with 277 VAC input and 200 volt LED string voltage, the converter may operate in boost mode at the beginning of the cycle (e.g., low instantaneous input voltage), change to buck-boost mode later on as the input voltage raises, and change to buck mode as the input voltage rises above 200V, etc.

Figure 4:
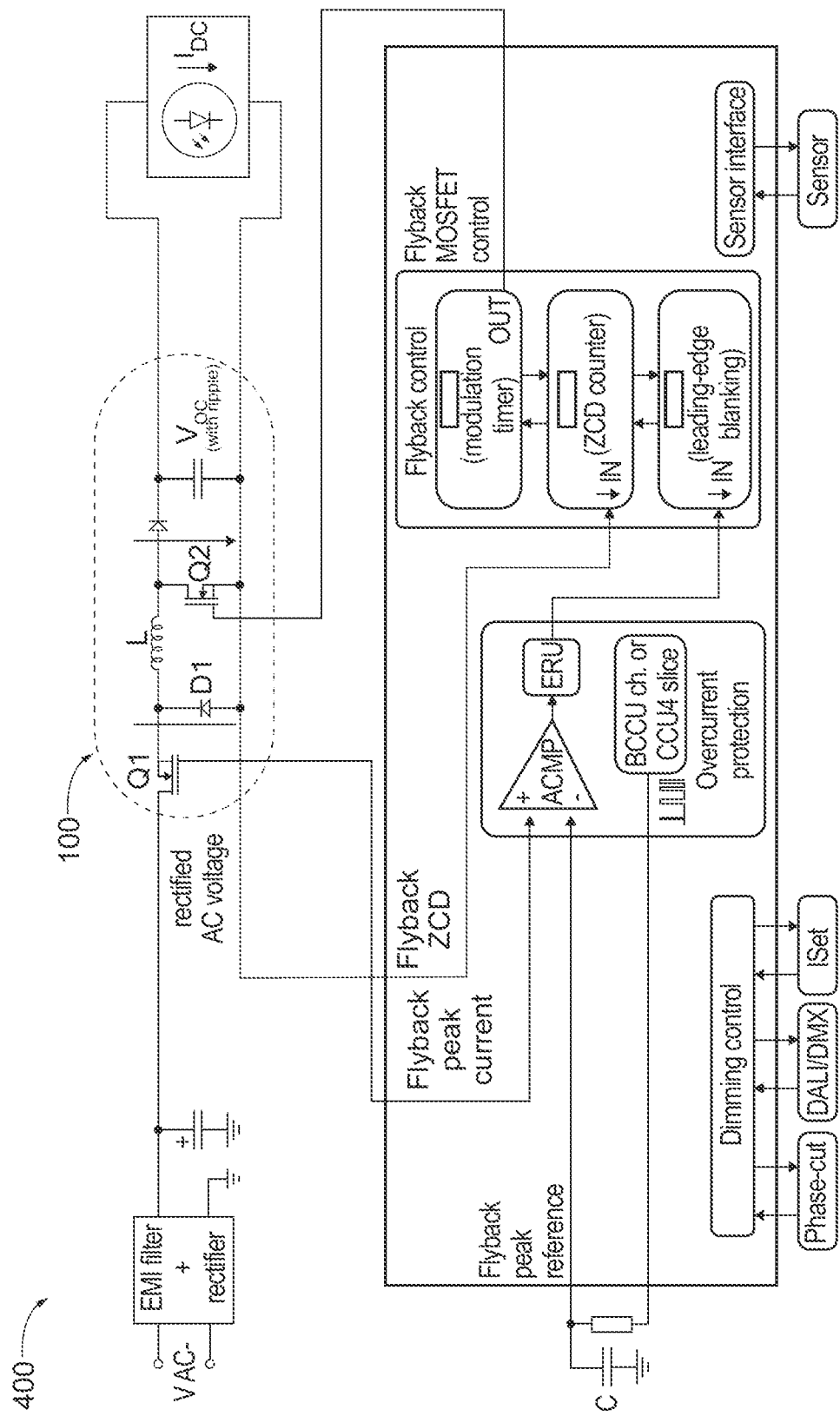
FIG. 4 is an exemplary circuit diagram of a tubular light emitting diode (LED) ballast including a buck-boost converter, according to one aspect.

FIG. 4 is an exemplary circuit diagram 400 of a tubular light emitting diode (LED) ballast including the above described buck-boost converter, according to one aspect.

An efficiency improvement over known "static" converters of up is expected. A "static" flyback converter may be replaced, for example, with the "dynamic" switchable technology shown in FIGS. 1-3 below with an expected tubular LED (TLED) efficiency improvement of 3%-5%. This enables keeping the auxiliary supply alive by injecting buck-boost cycles (mitigating a need for a separate auxiliary power supply).

After startup, the 15V DC supply voltage may be derived via an extra winding on the main inductor (also used for demagnetization detection). The derived voltage may need to stay within a relatively narrow range to be useful. Unfortunately, the derived voltage is different in boost mode ((Vout-Vin)/transformer ratio) versus buck or buck-boost mode (Vout/transformer ratio) so it is possible that the 15V supply voltage cannot be maintained when the circuit runs on the 120 VAC grid and spends several switching cycles in boost mode. To mitigate this, the circuit may temporarily switch the topology to buck-boost mode for a few cycles to give the 15V supply capacitor a little extra charge. This should not have much of a negative impact on efficiency or power factor.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A tubular light emitting diode (LED) ballast including a buck-boost converter circuit, comprising:
   a first switch having a first end and a second end;
   an inductor having a first end and a second end;
   a first diode having a cathode end and an anode end, wherein the cathode end of the first diode is coupled to the first end of the inductor and the second end of the first switch;
   a second switch having a first end and a second end;
   a modulation timer driving the second switch;
   a second diode having a cathode end and an anode end, wherein the anode end of the second diode is coupled to the second end of the inductor and the first end of the second switch; and
   a capacitor having a first end and a second end, wherein the second end of the capacitor is coupled to the second end of the second switch and the anode end of the first diode and wherein the first end of the capacitor is coupled to the cathode end of the second diode.

2. The tubular LED ballast of claim 1, wherein the first switch and the second switch are transistors.

3. The tubular LED ballast of claim 1, wherein in a first, buck-boost converter mode, the first switch and the second switch are driven by a same input signal.

4. The tubular LED ballast of claim 3, wherein the first switch and the second switch are driven by a waveform input signal.

5. The tubular LED ballast of claim 3, wherein first diode and the second diode are freewheeling diodes.

6. The tubular LED ballast of claim 1, wherein in a second, buck converter mode, the first switch is driven by a waveform input signal and the second switch is open.

7. The tubular LED ballast of claim 6, wherein first diode is a freewheeling diode.

8. The tubular LED ballast of claim 1, wherein in a third, boost converter mode, the first switch is closed and the second switch is driven by a waveform input signal.

9. The tubular LED ballast of claim 8, wherein second diode is a freewheeling diode.

10. The tubular LED ballast of claim 1, wherein the first switch and the second switch are driven based on a reading associated with the inductor.

11. The tubular LED ballast of claim 1 wherein the first switch and the second switch are driven based on a rectified AC voltage across the first diode.

12. The tubular LED ballast of claim 1, wherein the first switch and the second switch are driven based on sensing a DC voltage across the capacitor.

13. A tubular light emitting diode (LED) ballast including a buck-boost converter circuit, comprising:
   a first switch having a first end and a second end;
   a first loop including:
   an inductor having a first end and a second end;
   a first diode having a cathode end and an anode end, wherein the cathode end of the first diode is coupled to the first end of the inductor and the second end of the first switch; and
   a second switch having a first end and a second end;
   a modulation timer driving the second switch; and
   a second loop including:
   a second diode having a cathode end and an anode end, wherein the anode end of the second diode is coupled to the second end of the inductor and the first end of the second switch;
   a capacitor having a first end and a second end, wherein the second end of the capacitor is coupled to the second end of the second switch and the anode end of the first diode and wherein the first end of the capacitor is coupled to the cathode end of the second diode.

14. The tubular LED ballast of claim 13, wherein in a first, buck-boost converter mode, the first switch and the second switch are driven by a same input signal.

15. The tubular LED ballast of claim 13, wherein in a second, buck converter mode, the first switch is driven by a waveform input signal and the second switch is open.

16. The tubular LED ballast of claim 13, wherein in a third, boost converter mode, the first switch is closed and the second switch is driven by a waveform input signal.

17. A tubular light emitting diode (LED) ballast including a buck-boost converter circuit, comprising:
   a first switch having a first end and a second end;
   an inductor having a first end and a second end;
   a first diode having a cathode end and an anode end, wherein the cathode end of the first diode is coupled to the first end of the inductor and the second end of the first switch;
   a second switch having a first end and a second end;
   a modulation timer driving the second switch;
   a second diode having a cathode end and an anode end, wherein the anode end of the second diode is coupled to the second end of the inductor and the first end of the second switch; and
   a capacitor having a first end and a second end, wherein the second end of the capacitor is coupled to the second end of the second switch and the anode end of the first diode and wherein the first end of the capacitor is coupled to the cathode end of the second diode,
   wherein in a first, buck-boost converter mode, the first switch and the second switch are driven by a waveform input signal,
   wherein in a second, buck converter mode, the first switch is driven by the waveform input signal and the second switch is open, and
   wherein in a third, boost converter mode, the first switch is closed and the second switch is driven by the waveform input signal.

18. The tubular LED ballast of claim 17, wherein the first switch and the second switch are driven based on a reading associated with the inductor.

19. The tubular LED ballast of claim 17, wherein the first switch and the second switch are driven based on a rectified AC voltage across the first diode.

20. The tubular LED ballast of claim 17, wherein the first switch and the second switch are driven based on sensing a DC voltage across the capacitor.

* * * * *